United States Patent [19]
TeKolste et al.

[11] Patent Number: 5,384,650
[45] Date of Patent: Jan. 24, 1995

[54] LIGHT VALVE WITH TWISTED PERPENDICULAR LIQUID CRYSTAL WITH A NEGATIVE DIELECTRIC ANISOTROPY

[75] Inventors: Robert D. TeKolste, San Diego; Rodney D. Sterling, Carlsbad, both of Calif.

[73] Assignee: Hughes Aircraft Company, Los Angeles, Calif.

[21] Appl. No.: 863,659

[22] Filed: Apr. 6, 1992

[51] Int. Cl.$^6$ .................. G02F 1/1337; G02F 1/1335; G02F 1/13

[52] U.S. Cl. .................................... 359/77; 359/102; 359/62; 359/63; 359/99

[58] Field of Search ...................... 359/55, 63, 75, 76, 359/77, 78, 84, 103, 99, 100, 102, 62

[56] References Cited

U.S. PATENT DOCUMENTS

| | | | |
|---|---|---|---|
| 2,403,731 | 7/1946 | MacNeille . | |
| 3,874,163 | 4/1975 | Ikeno | 359/63 |
| 3,964,158 | 6/1976 | Janning | 359/76 |
| 4,019,807 | 4/1977 | Boswell et al. | 359/71 |
| 4,068,925 | 1/1978 | Tani et al. | 359/77 |
| 4,127,322 | 11/1978 | Jacobson et al. | 353/31 |
| 4,191,456 | 3/1980 | Hong et al. | 353/31 |
| 4,252,417 | 2/1981 | Scheffer et al. | 359/77 |
| 4,343,535 | 8/1982 | Bleha, Jr. | 350/342 |
| 4,357,374 | 11/1982 | Ogawa | 359/77 X |
| 4,426,133 | 1/1984 | Fonada et al. | 359/63 |
| 4,505,548 | 3/1985 | Berreman et al. | 359/75 |
| 4,521,080 | 6/1985 | Funada et al. | 359/76 |
| 4,522,468 | 6/1985 | Goscianski | 359/63 |
| 4,650,286 | 3/1987 | Koda et al. | 350/331 R |
| 4,664,482 | 5/1987 | Kondo et al. | 359/63 |
| 4,776,674 | 10/1988 | Filas et al. | 359/77 X |
| 4,892,390 | 1/1990 | Funada et al. | 359/63 |
| 4,908,702 | 3/1990 | Chao et al. | 359/63 X |
| 4,917,472 | 5/1990 | Margesum et al. | 359/93 |
| 5,182,664 | 1/1993 | Clerc | 359/77 |
| 5,317,429 | 5/1994 | Mochizuki et al. | 359/102 |

FOREIGN PATENT DOCUMENTS 2227853 of 0000 United Kingdom .

OTHER PUBLICATIONS

Applied Physics Letters, vol. 29, No. 11, Dec. 1976, "New Technique of Aligning Liquid Crystals on Surfaces", Dietich Meyeshofer.

Lackner, Anna M., et al.; Proceedings of the SID, vol. 31/4, 1990; Los Angeles, U.S.; "Photostable Tilted-Perpendicular Alignment of Liquid Crystals for Light Valves"; pp. 321-326.

Jacobson, Alexander D., et al.; SID International Symposium Digest of Technical Papers, Apr. 1975; Washington; "A New Television Projection Light Valve"; pp. 26-27.

Sonehara, Tomio; Japanese Journal of Applied Physics, vol. 29, No. 7, Jul. 1990; Tokyo, Japan; "Photo-Addressed Liquid Crystal SLM with Tristed Nematic ECB (TN-ECB) Mode"; pp. L 1231 through L 1234.

Hudson, T. D., et al.; Applied Optics, vol. 30, No. 20, 10 Jul. 1991; New York, U.S.; "Performance Characteristics of an Optically Addressed Ferroelectric Liquid-Crystal Spatial Light Modulator"; pp. 2867-2872.

Lackner, Anna M., et al.; "Photostable Tilted-Perpendicular Alignment of Liquid Crystals for Light Valves;" SID 90 Digest; pp. 98-101, 1990.

Primary Examiner—William L. Sikes
Assistant Examiner—Kenneth Parker
Attorney, Agent, or Firm—Georgann S. Grunebach; Terje Gudmestad; W. K. Denson-Low

[57] ABSTRACT

A liquid crystal light valve projection system is provided with increased optical overshoot, and thereby decreased optical response time, by employing a liquid crystal mixture (52) having molecules substantially perpendicularly aligned to the face of the liquid crystal light valve electrodes (42,70) and axially twisted. The axial twist of the liquid crystal molecules is provided by laying down alignment grooves (90,92,96,98) for the liquid crystal mixture that are oriented with respect to one another, on the opposite alignment layers, by an angle of between about 45° and 90°. This mutually angled orientation of the opposed alignment grooves on the opposed alignment layers causes optical overshoot of the system to vary when the entire liquid crystal cell (34) is rotated relative to the output polarizer (18) about an axis perpendicular to the output face of the cell. This rotation of the cell (34) of twisted perpendicular liquid crystal relative to the output polarizer (18) allows a faster optical rise time to be achieved.

21 Claims, 2 Drawing Sheets

LIGHT VALVE WITH TWISTED PERPENDICULAR LIQUID CRYSTAL WITH A NEGATIVE DIELECTRIC ANISOTROPY

BACKGROUND OF THE INVENTION

1. Field of the Invention

This invention relates to liquid crystal light valve systems, and more particularly concerns improvement in optical rise time of such a system.

2. Description of Related Art

The liquid crystal light valve (LCLV) is a thin film multi-layer structure comprising a liquid crystal layer between a pair of alignment layers, a dielectric mirror layer, a light blocking layer and a photosensitive layer, all sandwiched between two transparent electrodes. In a typical reflective LCLV projection system, a high intensity polarized projection beam is directed through the liquid crystal layer to the dielectric mirror. An input image of low intensity light, such as that generated by a cathode ray tube, is applied to the photosensitive layer, thereby switching the electric field across the electrodes from the photosensitive layer onto the liquid crystal layer, so as to selectively activate the liquid crystal according to the intensity of input light received at different areas of the photosensitive layer. Linearly polarized projection light from a light source (often, but not always of high power), such as a Xenon lamp, passes through the liquid crystal layer and is reflected from the dielectric mirror. The light is polarization modulated going into and coming from the system. It is reflected from the mirror and polarization modulated by the liquid crystal in accordance with light information incident on the photo responsive layer. Therefore, if a complex spatial distribution of light, for example a high resolution input image from a cathode ray tube, is focused onto the photosensitive layer, the liquid crystal layer light valve converts the low intensity input image into a replica image which can be reflected for projection with magnification to produce a high brightness image on a viewing screen. Projection systems of this type are described in several U.S. patents, including U.S. Pat. Nos. 4,650,286 to Koda, et al for Liquid Crystal Light Valve color Projector; 4,343,535 to Bleha, Jr. for Liquid Crystal Light Valve; 4,127,322 to Jacobson, et al for High Brightness Full Color Image Light Valve Projection System; and 4,191,456 to Hong, et al for Optical Block For High Brightness Full Color Video Projection System.

The ability of such a projection system to respond to fast variations of input light depends in large part upon the speed of optical response of the liquid crystal material.

Accordingly, it is an object of the present invention to provide a liquid crystal light valve having improved optical response time.

SUMMARY OF THE INVENTION

In carrying out principles of the present invention in accordance with a preferred embodiment thereof, a liquid crystal device includes a liquid crystal cell having first and second alignment layers having alignment grooves. The grooves extend in one direction on one of the layers and in a different direction on the other. The alignment layers define a containment volume between them and a perpendicular alignment liquid crystal mixture is placed in the containment volume. The alignment grooves of one alignment layer are oriented at an angle of between about 45° and 90° with respect to the alignment grooves of the other layer, and, after assembly of the liquid crystal cell, the entire cell is rotated relative to the output polarizer of the projection system until an optimum optical overshoot or optimum optical rise time is observed.

DESCRIPTION OF THE PREFERRED EMBODIMENT

Figure 1:
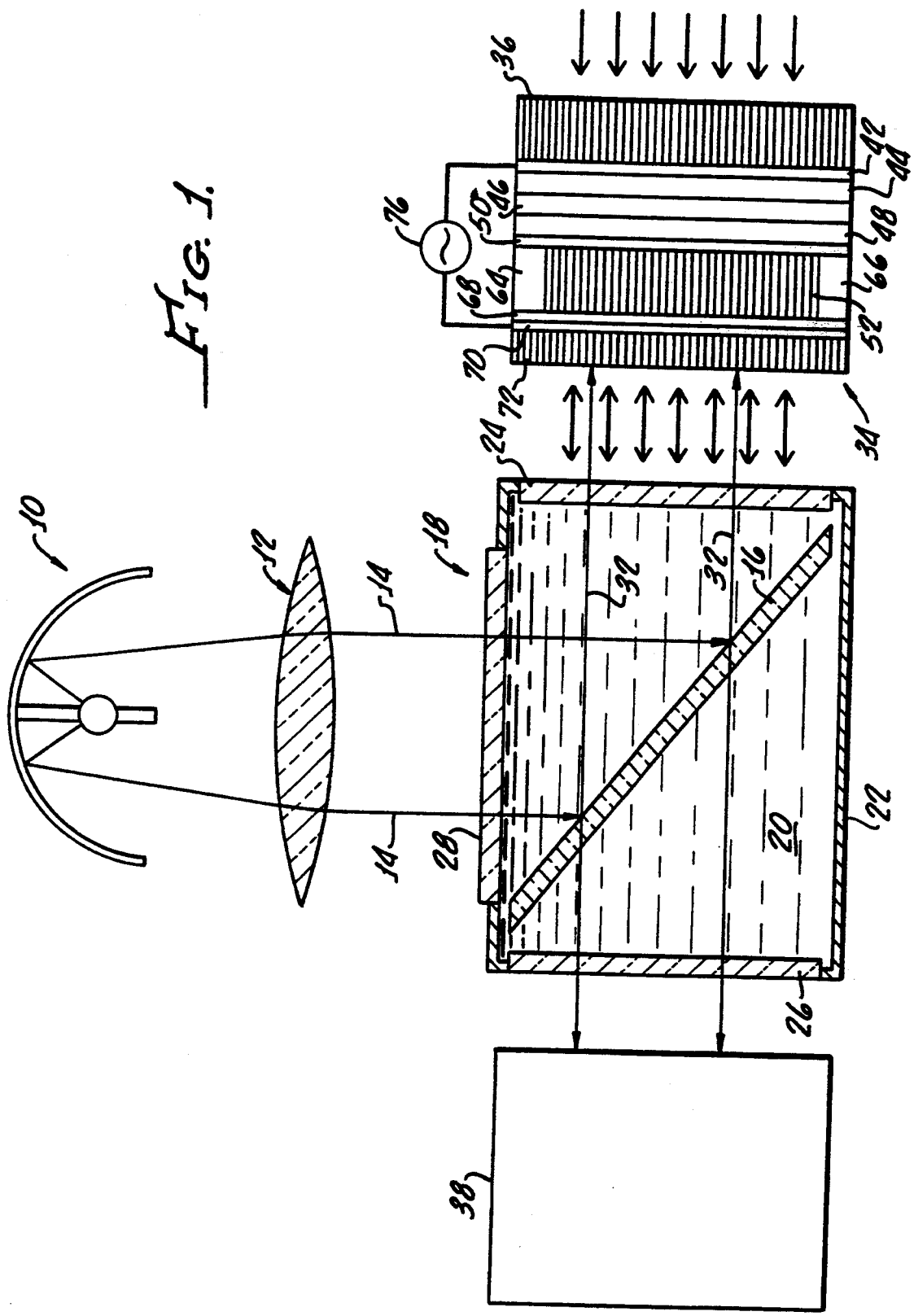
FIG. 1 illustrates a liquid crystal light valve projection system, showed a schematic cross section of a liquid crystal light valve thereof.

Illustrated in FIG. 1 is a liquid crystal light valve projection system of the type generally shown in U.S. Pat. Nos. 4,343,535 to Bleha, Jr. and 4,650,286 to Koda, et al. This projection system embodies a high power light source, such as a high brightness arc lamp 10, emitting unpolarized light that is transmitted through a collimating lens 12, which directs the light beam 14 to a polarizing beam splitter 18, shown as an embedded version of a MacNeille prism. The MacNeille prism accomplishes selective polarization as generally described in the U.S. Pat. No. to MacNeille, 2,403,731. The embedded prism 18, schematically depicted in FIG. 1, comprises a parallel flat sided transparent prism plate 16 coated with a plurality of thin dielectric layers, and suspended in a prismatic fluid 20, all carried in a fluid tight housing, generally indicated at 22, and having a transparent front window 24 and a transparent exit window 26.

The polarizing beam splitter 18 includes an input window 28 through which it receives randomly polarized light from arc lamp source 10. In general the beam splitter transmits light of one polarization state, such as the "P" polarization state for example, and reflects light of another polarization, such as the polarization state "S" for example.

Reflected light of S polarization state travels in a reflected beam 32 to a liquid crystal light valve 34 that is modulated by an image generating source, which may be a cathode ray tube (not shown) having an output face plate, such as a fiber optic face plate 36. Where the screen of the cathode ray tube 36 has no phosphor emission, and is therefore dark, the corresponding area of the light valve 34 remains in an off or dark state, and light is retroreflected from the dark part of the light valve 34 back to the polarizing beam splitter with its polarization state unchanged. Because the polarization of the light is unchanged from its original S state, this light is again reflected from the beam splitter and is returned toward the light source 10. None of this light of polarization state S is transmitted by the beam splitter from the light valve 34 to the projection lens, and thus the corresponding areas imaged by the projection lens 38 remain dark. For those areas of the screen of the cathode ray tube output plate 36 that are bright, corresponding areas of the liquid crystal light valve are in the on state and are also bright. Some or all of the light reflected from such bright areas of the light valve 34 is rotated from S polarization state to P polarization state by the liquid crystal light valve, acquiring an intensity that is nearly proportional to the intensity of the light from the cathode ray tube. The retroreflected light of polarization state P is transmitted from the liquid crystal light valve through the polarizing beam splitter 18, passing through the beam splitter exit window 26 and projection lens 38 to form a bright image on a projection screen (not shown).

A simplified liquid crystal light valve 34, shown in schematic cross section in FIG. 1, comprises a multi-layer structure composed of a stack of dielectric materials of various resistivities and thicknesses. From right to left, the typical cross section of a liquid crystal light valve illustrated in FIG. 1 includes the input structure 36, which may be the fiber optic face plate of a cathode ray tube for example, a transparent conductive primary electrode 42 of indium tin oxide for example, and a photosensitive layer 44, formed of either an amorphous silicon layer or a single crystal silicon with a pattern of diodes thereon for impeding lateral migration of excited areas of the liquid crystal light valve. A light absorbing layer 46 (typically of cadmium telluride) is positioned adjacent the diode array of the photosensitive layer and itself is positioned adjacent a dielectric mirror 48 formed, in one embodiment, of alternating layers of silicon dioxide and titanium dioxide. In succession the next layers comprise a first liquid crystal alignment layer 50 (of silicon dioxide for example), a nematic liquid crystal material 52 confined between peripheral spacer pads 64, 66, a second liquid crystal alignment layer 68 (again, for example, of silicon dioxide), a transparent conductive counter electrode 70, and an output quartz window 72. Bonding layers (not shown) of cadmium telluride and silicon dioxide are provided between layers 44 and 46 and between layers 46 and 48 for proper adherence of these layers.

The light valve is provided with an audio frequency voltage signal from a source 76 connected to the primary and counter electrodes 42 and 70, which establishes an alternating current across the multi-layer structure. This voltage is typically adjusted to the voltage at which the liquid crystal layer is at its threshold. The optically addressed light valve is provided with a varying optical input of relatively low intensity in the form of writing light from the fiber optic face plate 10, via the cathode ray tube (not shown). The writing light is applied through the transparent conductive primary electrode 42 to the photosensitive layer 44, which generates a spatial pattern of impedance reduction according to the spatial pattern of the intensity of light received at different areas thereof. This reduction of the AC impedance of the layer causes an increase in the AC voltage dropped across the liquid crystal layer. With application of the voltage from the photosensitive layer the audio frequency induced voltage is augmented, and a voltage above its threshold is applied to the liquid crystal, which changes orientation of its molecules.

This writing light induced orientation causes changes of the polarization state of reading light from the polarizing prism 18 passing through the liquid crystal layer, to be changed at different areas according to the spatial pattern of voltages produced by the photosensitive layer. The high intensity reading light is applied through the quartz window 70, and through the liquid crystal layer, to be reflected from dielectric mirror 48 back through the liquid crystal to produce an output optical image with a polarization pattern determined by the polarization state of the different areas or pixels of the liquid crystal layer. Thus a high intensity optical image of the writing light pattern is produced for display.

Typically, molecules of the liquid crystal mixture are aligned by use of the alignment layers 50,68. Alignment grooves are formed in the alignment layers by shallow angle ion beam etching, for example, or by vapor deposition of the alignment layer material, such as silicon dioxide. Such alignment grooves are used for the liquid crystal, whether the liquid crystal molecules are of the perpendicular alignment mode (tilted perpendicular alignment mode) as in the present invention, or of the tilted parallel alignment mode in which the long axes of the molecules are approximately parallel to the planes of the electrodes, as in the above identified patent to William P. Bleha, Jr., U.S. Pat. No. 4,343,535. In the Bleha patent, which describes techniques for formation of alignment grooves by shallow angle ion beam etching or grazing angle deposition of inert insulating material, the long axes of the molecules are tilted approximately five degrees from the plane of the electrodes.

The present invention, as distinguished from the parallel alignment liquid crystal of the patent to Bleha, is concerned with a tilted perpendicular alignment of liquid crystal molecules in which an improved response time is achieved.

Principles of the present invention may be employed with the liquid crystal light valve and materials of the type described in the paper entitled "Photostable Tilted—Perpendicular Alignment of Liquid Crystals for Light Valves" by Lackner, Margerum, Miller, and Smith, Jr. of Hughes Research Laboratories, found on pages 98–101 of the SID 90 Digest. The contents of this paper are incorporated herein by this reference as though fully set forth. This paper describes steps involved in the deposition of silicon dioxide alignment layers, which steps may be carried out in the performance of the present invention. A liquid crystal material ZLI 2857 made by E. Merck has been used in carrying out this invention.

For example, as described in the paper by Lackner, et al, the steps include a medium angle deposition of silicon oxide, typically at a 30° grazing angle, with a coating of about 50 to 500 (preferably about 125) angstroms thickness, followed by a shallow angle deposition of silicon dioxide, typically at a smaller 5° grazing angle, with a coating of about 5 to 50 (preferably about 25) angstroms, which is laid down orthogonally to the first coating. This results in a grid of primary (thicker and deeper) alignment grooves that are orthogonal to secondary (thinner and shallower) grooves. The paper further describes subsequent reaction with a long chain aliphatic alcohol by heating the alignment layer in the presence of alcohol in liquid or vapor state. In the device of the Lackner, et al article, the purpose of providing alignment grooves is to achieve a small uniform direction off state pre-tilt of the liquid crystal molecules of a few degrees (typically 1° to 4° tilt about an axis perpendicular to the liquid crystal molecule axis) off the perpendicular to the plane of the alignment layers. In the arrangement of the Lackner, et al article, the grooves on one alignment layer are laid down parallel to the grooves in the other alignment layer (primary grooves on one layer parallel to primary grooves on the other layer), and no consideration is given in the article of controlling the orientation of the alignment grooves to affect optical response time.

Applicants have discovered that improved optical response time can be achieved by angularly orienting the alignment grooves of one alignment layer, such as alignment layer 50, with respect to the alignment grooves of the other layer 64 by between about 45° and 90°. In a cell having such relative rotation of alignment grooves, optical response time of the cell is itself responsive in magnitude to angular orientation of the entire cell with respect to the output polarizer 18.

Accordingly, to achieve an improved optical response time, alignment grooves in one layer, such as layer 50, are laid down at an angle with respect to alignment grooves in the other layer, 64. Actually, as described above, the alignment grooves form a grid on each alignment layer, with primary grooves of the grid being formed in a thicker silicon dioxide layer, in the order of about 125 angstroms thick, and deposited at a higher grazing angle, such as an angle of 30°. These primary alignment grooves are perpendicular to the secondary alignment grooves (of the same alignment layer) in the thinner silicon dioxide layer, such as a layer of about 5 to 50 angstroms, laid at a smaller grazing angle, such as 5° for example. Thus alignment groove patterns of each alignment layer comprise a grid formed of primary and secondary grooves which are orthogonal to one another. In the finally assembled cell, according to the present invention, the primary grooves of one alignment layer are preferably at an angle of about 50° with respect to the primary alignment grooves of the opposing alignment layer. It follows that the secondary alignment grooves of the one layer of the assembled cell are angularly displaced by the same 50° angle with respect to the secondary alignment grooves of the second layer.

Figure 2:
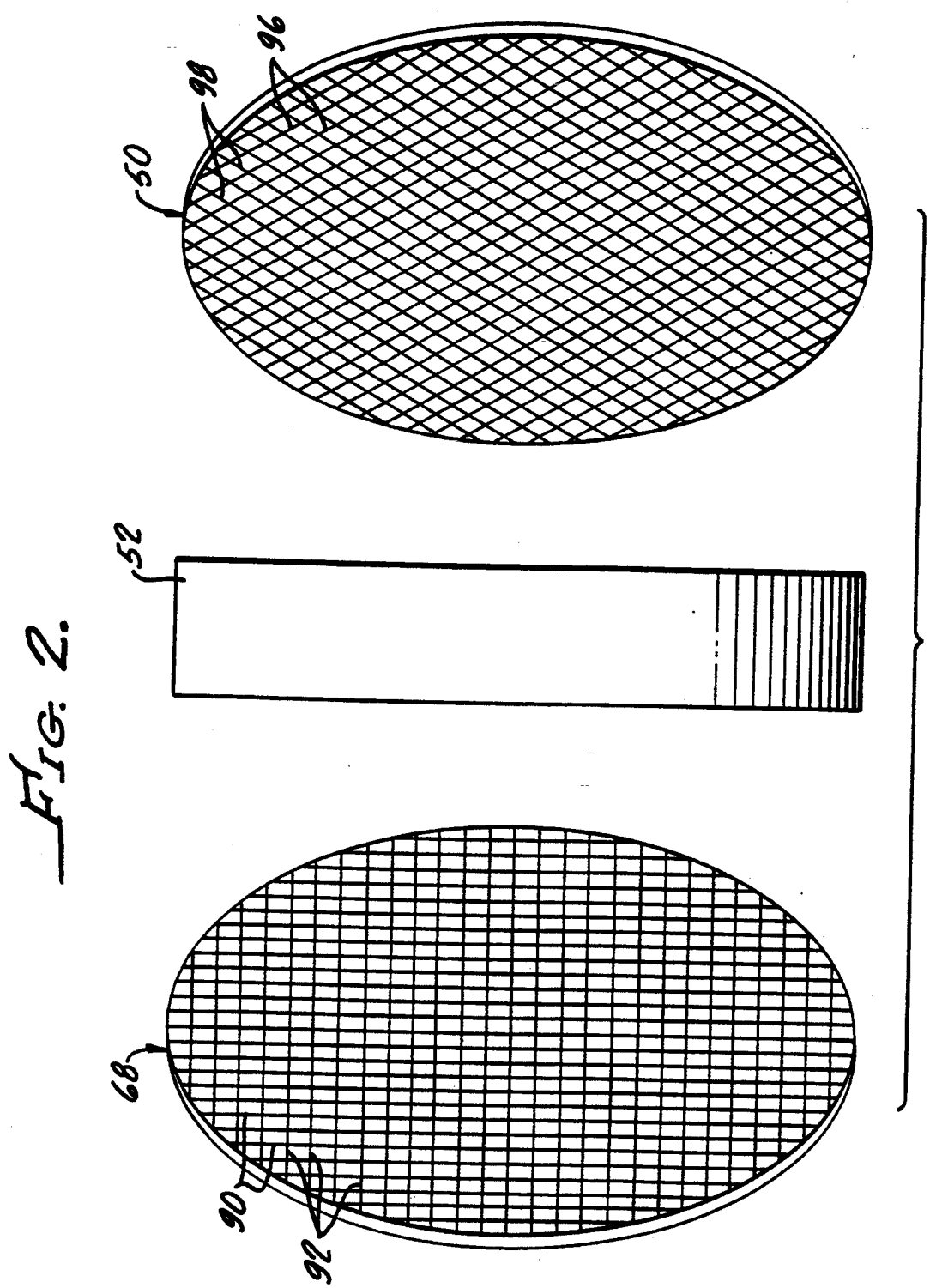
FIG. 2 illustrates schematically the mutually angulated orientation of alignment grooves of the liquid crystal alignment layers.

Such an arrangement is simplistically illustrated in FIG. 2 for an assembled cell. This drawing shows the grid pattern of alignment grooves on the first alignment layer 68 as including primary alignment grooves 90 and secondary alignment grooves 92. The second alignment layer 50 is also illustrated in FIG. 2 as including primary alignment grooves 96 extending at an angle of 50° with respect to the direction of primary alignment grooves 90 of layer 68. Secondary alignment grooves 98 of the second alignment layer 20 are orthogonal to the primary alignment grooves 96, but also extend at an angle of 50° with respect to the secondary alignment grooves 92 of the alignment layer 68.

It is believed that the elongated molecules of the liquid crystal mixture in contact with the first alignment layer 68 have an orientation (about their longitudinal axes) determined by the direction of the alignment grooves. Similarly, the molecules of the liquid crystal mixture adjacent the other alignment layer 50 have an orientation (about their longitudinal axes) dependent upon the direction of the alignment grooves of this alignment layer. Since these two alignment directions are angulated with respect to one another, the liquid crystal molecules exhibit an axial twist from one alignment layer 68 to the other alignment layer 50. In addition, as previously mentioned, all of the molecules are substantially perpendicular to the surfaces of the alignment layers, that is, they are tilted by about 1° to 4° from a perpendicular to such surface. However, it is the axial twist of the liquid crystal molecules in the direction extending from one alignment layer to the other that is believed to achieve the result in the present invention of enabling rotational adjustment of the assembled cell relative to the polarizer so as to decrease optical response time.

When the completed liquid crystal light valve cell is assembled with the output polarizer 18, the entire cell is adjustably rotated about an axis perpendicular to its output plane (e.g. about the axis of light impinging upon and reflected from its output face or window 72), and change in optical response time of the system is observed. Detection of the magnitude of the optical response time is most readily observed by observing overshoot of the output light beam from the system in the presence of a sharp or stepped input light. The greater the optical overshoot, the faster the response time. Thus, to attain optimum response time, the entire cell with its mutually angulated primary alignment grooves is rotated until the optical response time reaches a minimum. The optical cell, of course, at this time is a fixed stable sub-assembly of the projection system, and during such rotation (and thereafter), the two alignment layers 68 and 50 remain fixedly oriented relative to one another by the predetermined amount, which is, as previously mentioned, between 45° and 90°, preferably about 50°.

If the orientation angle between primary grooves on one alignment layer and primary grooves on the other alignment layer is less than about 45°, it is found that no significant improvement in response time results for any rotation of the entire cell. As this angle is increased (in different test cells) from 45° the decrease in response time that can be achieved continues to increase until an angle in the order of 50° to 60° between primary grooves of the alignment layers is used. If the angle between the primary grooves of the alignment layers is increased beyond 60°, the output image begins to deteriorate and exhibit adverse characteristics, although decreased optical response time can still be achieved.

Accordingly, it will be seen that the described methods and apparatus yield improved visual characteristics in high speed or video applications of light valve technology. By angulating the primary alignment grooves of the two alignment layers of a tilted perpendicular alignment liquid crystal, the optical rise time can be varied by rotation of the entire cell relative to its output polarizer, and, in fact, a faster rise time is achieved as compared to a similar cell with no relative angular orientation between primary grooves of its alignment layers.

The described liquid crystal alignment configuration is also applicable to devices other than a light valve. For example, the described alignment orientations may be used in a liquid crystal light transmissive shutter by providing appropriate alignment layers and electrodes as described herein. Such a shutter needs no photosensitive layer, light blocking layer, nor mirror layer (unless operable in a reflective mode) and would not carry spatially varying information.

What is claimed is:

1. A method of fabricating an LCLV projector comprising the steps of:

forming an LCLV cell including first and second mutually spaced alignment layers having primary alignment grooves oriented on one layer at an angle with respect to primary alignment grooves on the other layer, providing a liquid crystal mixture between said first and second alignment layers having a negative dielectric anisotropy and tilted perpendicular alignment liquid crystal molecules that are twisted about axes normal to the alignment layer in a direction extending from said first alignment layer to said second alignment layer, providing an output polarizer, mounting said cell and polarizer for transmission of light from the cell to the polarizer, and decreasing optical response time of said LCLV cell by relatively rotating said cell and polarizer until said optical response time reaches a decreased value.

2. The method of claim 1 wherein said step of decreasing response time includes applying input light to said cell to cause transmission of output light from said cell to said polarizer, detecting optical rise time of said output light, and rotating said cell to an angular position relative to said polarizer wherein the detected optical rise time is decreased.

3. A method of fabricating an LCLV projector comprising the steps of:

forming an LCLV cell including first and second mutually spaced alignment layers having primary alignment grooves oriented on one layer at an angle with respect to primary alignment grooves on the other layer, providing an output polarizer, mounting said cell and polarizer for transmission of light from the cell to the polarizer, and controlling optical response time by relatively rotating said cell and polarizer, said step of controlling response time including applying input light to said cell to cause transmission of output light from said cell to said polarizer, detecting optical overshoot of said output light, and rotating said cell to an angular position relative to said polarizer wherein the detected optical overshoot is increased.

4. The method of claim 3 including the step of filling the space between said alignment layers with liquid crystal having molecules that are perpendicular within the range of about one degree to four degrees in unpowered condition to the planes of said alignment layers.

5. The method of claim 3 wherein said step of forming an LCLV cell comprises forming said first alignment layer as a relatively thick first primary layer having relatively deep grooves therein, and forming a relatively thinner secondary layer on said primary layer having relatively shallow grooves therein extending at an angle to said relatively deep grooves.

6. The method of claim 5 wherein said step of forming an LCLV cell comprises forming said second alignment layer as a relatively thick second primary layer having relatively deep grooves therein, and forming a relatively thinner secondary layer on said second primary layer having relatively shallow grooves therein extending at an angle to said relatively deep grooves of said second primary layer.

7. A liquid crystal device comprising:

a liquid crystal cell including:

a first alignment layer having alignment grooves therein extending in a first direction, a second alignment layer having alignment grooves therein extending in a second direction transverse to said first direction, said alignment layers defining a containment volume between them, a liquid crystal mixture with a negative dielectric anisotropy in said containment volume having tilted perpendicular alignment liquid crystal molecules that are twisted about axes normal to the alignment layers in a direction extending from said first alignment layer to said second alignment layer, and a polarizer mounted adjacent said cell for transmitting light of a single polarization state to the cells and for transmitting light of a single polarization reflected from the-cell, said polarizer being rotatably oriented relative to said cell about an axis perpendicular to said alignment layers by an amount that provides a decreased response time of a light beam passed form said cell to the polarizer.

8. The device of claim 7 wherein the grooves of said first alignment layer extend at an angle of between about 45 degrees and 90 degrees with respect to the grooves of said second layer.

9. The device of claim 7 wherein grooves of said first and second alignment layers extend at an angle of between about 50 degrees and 60 degrees with respect to each other.

10. The liquid crystal device of claim 7 including a polarizer mounted adjacent said cell, said polarizer being rotatably oriented relative to said cell about an axis perpendicular to said alignment layer by an amount that provides a decreased response time of a light beam passed through said cell and polarizer.

11. A method of fabricating an LCLV projector comprising the steps of:

forming an LCLV cell including first and second mutually spaced alignment layers having primary alignment grooves oriented on one layer at an angle with respect to primary alignment grooves on the other layer, providing an output polarizer, mounting said cell and polarizer for transmission of light from the cell to the polarizer, and controlling optical response time by relatively rotating said cell and polarizer, said step of controlling response time including applying an input to said cell to cause transmission of output light from said cell to said polarizer, detecting optical overshoot of said output light, and rotating said cell to an angular position relative to said polarizer wherein the detected optical overshoot is increased.

12. A liquid crystal light valve projector system comprising:

a liquid crystal light valve having:

input and output faces, first and second alignment layers, and a liquid crystal mixture with a negative dielectric anisotropy between said alignment layers, said liquid crystal mixture including liquid crystal molecules substantially perpendicular to the planes of said alignment layers an axially twisted between said alignment layers, an output light source, and polarizing means for passing light from said output light source to the output face of said liquid crystal cell and for receiving light reflected form said liquid crystal cell for projection to an output of the system.

13. The liquid crystal light valve projector of claim 12 wherein said cell is angularly oriented relative to said polarizing means about an axis normal to said cell output face to a position in which optical rise time of output light reflected from said output face is decreased.

14. The liquid crystal light valve projector of claim 12 wherein said alignment layers include primary alignment grooves that are angularly oriented with respect to one another.

15. The liquid crystal light valve projector of claim 12 wherein said alignment layers include alignment grooves that are angularly oriented with respect to one another by an angle between about 45 degrees and 90 degrees.

16. A liquid crystal light valve projector system comprising:
   a liquid crystal light valve cell having:
      input and output faces,
      first and second alignment layers, and
      a liquid crystal mixture with a negative dielectric anisotropy between said alignment layers, said liquid crystal mixture including liquid crystal molecules substantially perpendicular to the planes of said alignment layers and axially twisted between in a direction, extending from one of said alignment layers to the other, an output light source, and
   polarizing means for passing light from said output light source to the output face of said liquid crystal cell and for receiving light reflected from said liquid crystal cell for projection to any output of the system said alignment layers including alignment grooves that are angularly oriented with respect to one another by an angle between about 50 degrees and 60 degrees.

17. A liquid crystal light valve cell comprising:
   a first alignment layer defining a first alignment direction,
   a second alignment layer defining a second alignment direction extending transverse to said first direction,
   said alignment layers defining a containment volume between them, and
   a liquid crystal mixture with a negative dielectric anisotropy in said volume between said alignment layers, said liquid crystal mixture being substantially perpendicularly aligned and axially twisted.

18. The liquid crystal cell of claim 17 wherein said first and second directions are angularly displaced from each other by an angle of between 45 degrees and 90 degrees.

19. The liquid crystal cell of claim 17 wherein said first and second directions are angularly displaced from each other by about 50 degrees, thereby imparting an axial twist to said liquid crystal mixture.

20. A liquid crystal light valve comprising:
   successive layers of:
      a transparent conductive electrode,
      a photosensitive material,
      a light blocking layer,
      a dielectric mirror,
      a first alignment film having a first alignment direction,
      a tilted perpendicular alignment liquid crystal mixture with a negative dielectric anisotropy,
      a second alignment film having a second alignment direction, and
      a counter electrode,
   said liquid crystal mixture having axially twisted liquid crystal molecules that are axially oriented in accordance with said alignment directions at respective ones of said alignment layers.

21. A liquid crystal light valve comprising:
   a layered assembly including:
      a pair of transparent conductive electrodes,
      a liquid crystal layer comprising:
         first and second alignment layers defining a containment volume therebetween, said layers having primary alignment grooves extending in first and second mutually angulated alignment directions on respective ones of said alignment layers, and
         a twisted perpendicular alignment liquid crystal mixture with a negative dielectric anisotropy in said containment volume between said align alignment layers and axially twisted about axes normal to said alignment layers,
      a mirror layer, and
      a photosensitive layer, said liquid crystal mirror and photosensitive layers all being sandwiched together between said transparent conductive electrodes.

* * * * *